No. 818,490. PATENTED APR. 24, 1906.
E. A. TRAPP.
SUBMARINE TELESCOPE AND MEANS FOR MOUNTING THE SAME.
APPLICATION FILED NOV. 29, 1904.
3 SHEETS—SHEET 1.
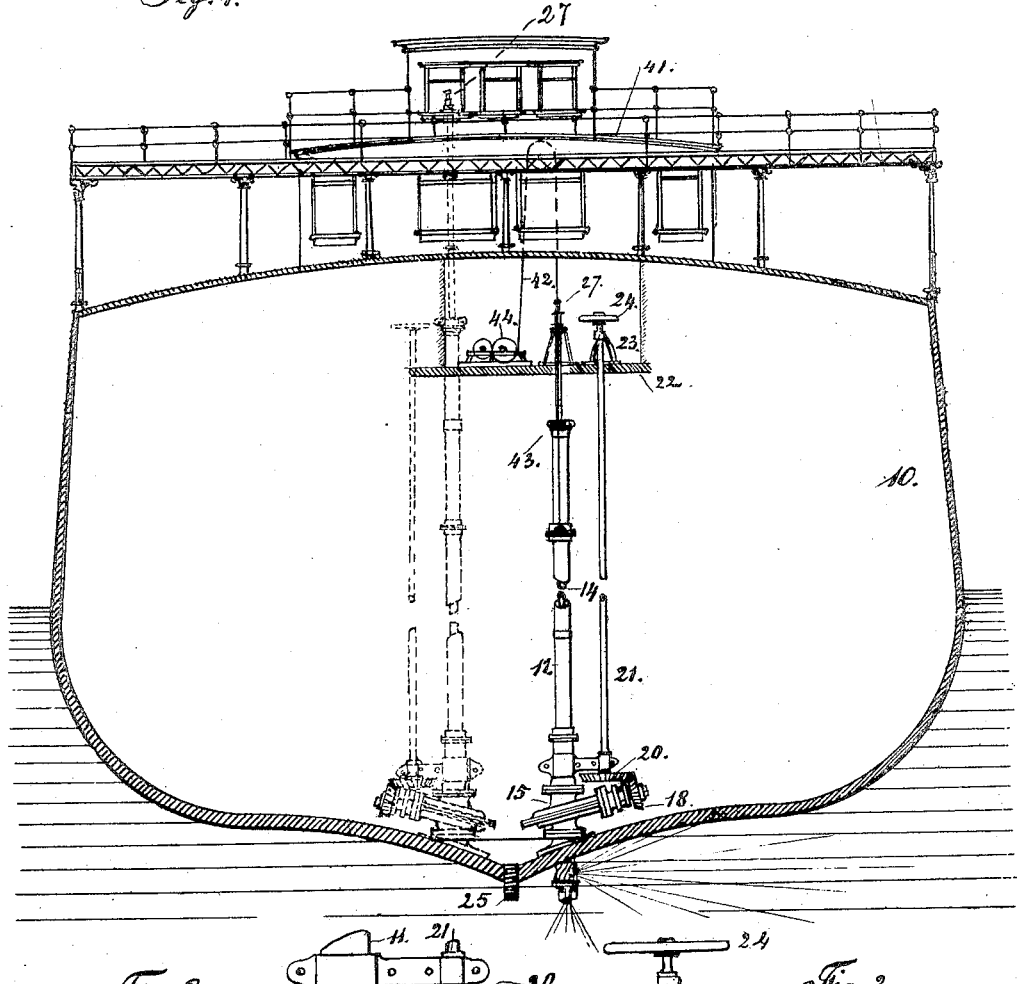
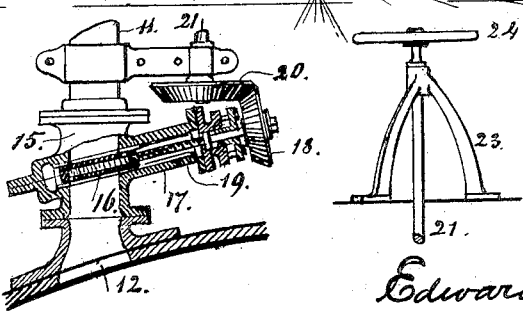
WITNESSES:
Arthur Marion.
Herman Gustow.
INVENTOR
Edward A. Trapp,
BY
Chas. C. Gill
ATTORNEY

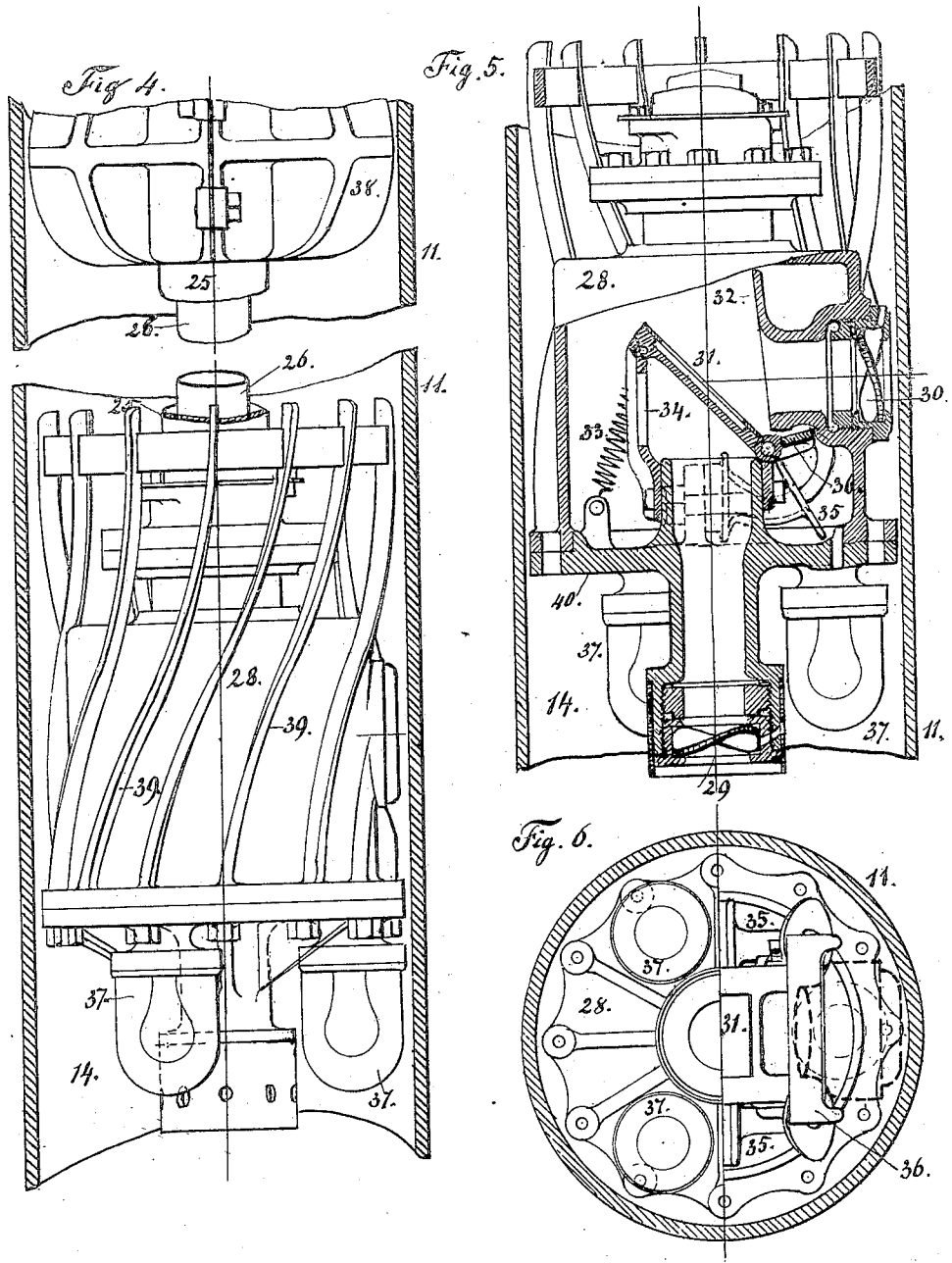

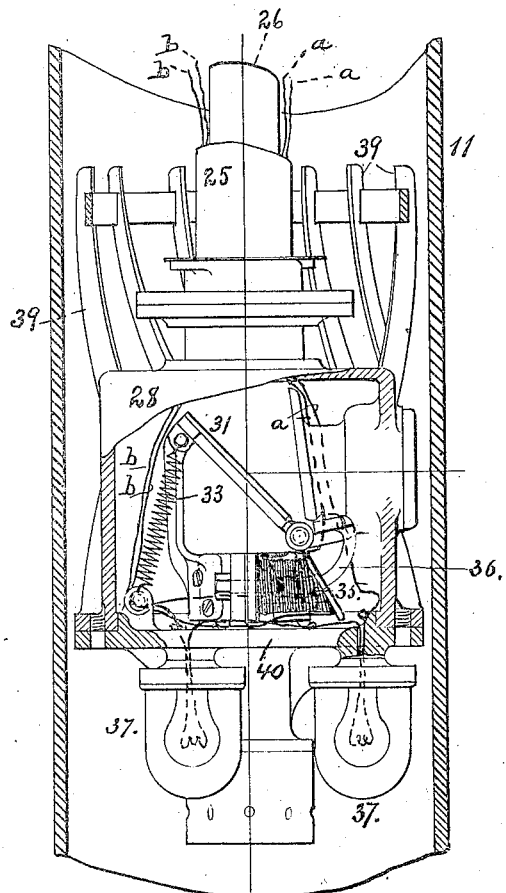
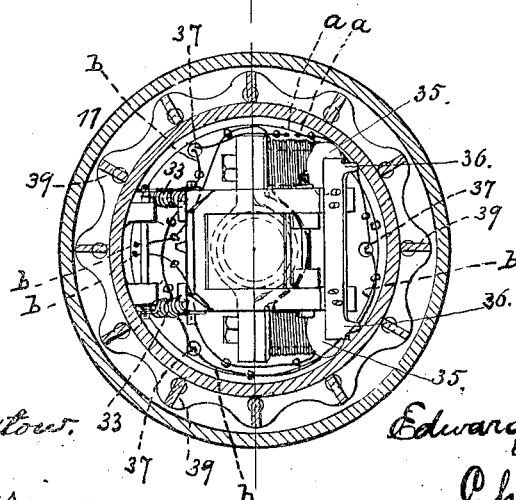

UNITED STATES PATENT OFFICE.

EDWARD A. TRAPP, OF NEW YORK, N. Y.

SUBMARINE TELESCOPE AND MEANS FOR MOUNTING THE SAME.

No. 818,490.    Specification of Letters Patent.    Patented April 24, 1906.

Application filed November 29, 1904. Serial No. 234,761.

*To all whom it may concern:*

Be it known that I, EDWARD A. TRAPP, a citizen of the United States, and a resident of New York, in the county of New York and State of New York, have invented certain new and useful Improvements in Submarine Telescopes and Means for Mounting the Same, of which the following is a specification.

The invention relates to improvements in submarine telescopes and to means for mounting and utilizing the same on or in vessels; and the said invention consists in the novel features and combinations of parts hereinafter described and claimed.

The special features of the telescope or instrument disclosed in this application, or many of them, are shown, described, and claimed in a pending application filed by me on November 14, 1904, Serial No. 232,591, and the purpose of the instrument is to enable observations to be made of conditions that may prevail below the surface of the water or at the bottom of the sea.

My present invention has to do with the equipping of vessels or ships with submarine telescopes; and to this end my invention comprises a vessel or ship having extended down through it a tube open at its lower end at the bottom of the vessel and adapted to receive the telescope, the latter being adapted to said tube and to be projected downwardly through the same and below the bottom of the vessel when desired. When the telescope is withdrawn upwardly into the tube, the lower end of the latter will be closed by a valve or gate. I preferably provide the vessel on each side of its keel with at least one of the tubes, each tube containing a submarine telescope.

My invention is especially desirable on war vessels, in which it may not be either expedient or convenient to suspend the submarine telescope from over the side of the vessel, where it would be exposed and not possibly prove so efficient in disclosing the presence of mines or obstructions in the path of the vessel.

The invention will be fully understood from the detailed description hereinafter presented, reference being had to the accompanying drawings, in which—

Figure 1 is a vertical transverse section through a portion of a vessel equipped with a submarine telescope, inclosing tube, and other features embodying my invention. Fig. 2 is an enlarged like section through a portion of the vessel and the inclosing tube, this view being presented to more clearly show the gate or valve for closing the lower end of said tube. Fig. 3 is an enlarged detached side elevation of the upper portion of the gate or valve-operating rod and the support therefor. Fig. 4 is an enlarged vertical section through a portion of the inclosing tube with a portion of the submarine telescope therein. Fig. 5 is a like view of same with the objective end of the instrument in central vertical section. Fig. 6 is a transverse section through the tube and shows at its left-hand half one-half of the lower end of the submarine instrument and at its right-hand half the top of the right-hand half of the bottom plate of said instrument with the parts carried thereby. Fig. 7 is an enlarged vertical section through a portion of the tube and through a portion of the submarine telescope, said tube and telescope being broken away; and Fig. 8 is a horizontal section of same, taken immediately above the lower part 40 at the lower end thereof.

In the drawings, 10 designates the vessel, which may be of any type, 11 the inclosing tube vertically supported therein in line with an opening 12 in the bottom of the vessel, and 14 the telescope or instrument inclosed within said tube 11, the latter extending upwardly from the bottom of the vessel to a point above the water-line and being provided in its lower portion with a valve-casing 15, containing a gate or valve 16, having a threaded bore to be engaged by the threaded screw 17, connected with a beveled gear-wheel 18, so that when said wheel 18 is turned in one direction the gate or valve 16 may slide from its closed position (shown in Fig. 2) to an open position within a portion 19 of the said casing 15, and when said wheel 18 is turned in a reverse direction the said valve or gate 16 may move across the line of the tube 11 into the position shown in Fig. 2, said gate or valve 16 when in its closed position preventing the water from dashing up into the tube 11 and possibly injuring the telescope or instrument 14. The beveled gear-wheel 18 is in mesh with a corresponding wheel 20, secured upon the lower end of an operating-rod 21, which extends upwardly through a platform or deck 22 and frame 23 thereon and is provided upon its upper end with a hand-wheel 24, by which said rod 21 may be conveniently turned in either direction. The wheel 24 will be turned in one direction when it is desired to move the valve 16 to clear the lower end of the tube 11 and in the reverse direction when it is desired to move said gate or valve 16 from its open to its closed position.

The tube 11 will preferably be arranged near the longitudinal center line of the vessel, so that its lower end may open at one side of but adjacent to the keel 25 of the vessel, it being intended that the lower end of the instrument or telescope 14 shall not project when in use below the lower edge of said keel.

I shall preferably provide tubes 11 at opposite sides of the longitudinal center line of the vessel, as indicated by the dotted and full lines, respectively, in Fig. 1, so that observations may be taken downwardly through one or more of the instruments and also laterally in opposite directions, as hereinafter explained. I do not limit my invention to the employment of any special number of the inclosing tubes 11; but in the case of war vessels I should recommend the employment of several of said tubes at each side of the longitudinal center line of the vessel. The tubes 11 are simply plain iron tubes formed of sections suitably coupled together to form a tube of requisite length, and each of the tubes will be equipped with a valve 16.

The instrument 14 is in many respects the same in construction and operation as the submarine telescope made the subject of my aforesaid pending application filed November 14, 1904, and comprises an exterior barrel or tube 25 and an interior observation-tube 26, the said instrument having at its upper end a telescope 27 and at its lower end a box 28, carrying the vertically downwardly projected collecting or objective lens 29 and horizontally-projected collecting or objective lens 30, while within said box 28 is mounted the hinged reflector 31, adapted to stand in line with the objective lens 30 and vertical tube 26, as shown in Fig. 5, when it is desired to take observations in a horizontal direction and also to be closed upwardly against the flange 32 when it is desired to cut off the lens 30 and take observations directly downwardly through the lens 29. The lenses 29 30 are preferably double-concave cylindrical lenses of the character shown and described in my application, Serial No. 231,677, filed November 7, 1904, for Letters Patent for improvements in lenses. The reflector 31 is connected with a spring 33, whose tension is exerted to normally hold the reflector 31 in its right-angular position (shown in Fig. 5) against a suitable stop 34.

When it is desired to take observations by means of the lens 29, the operator will move the reflector 31 against the aforesaid flange 32, and this may be accomplished by the means described in my aforesaid pending application, which means comprise electromagnets 35, contained within the box 28 and adapted when energized to draw to them the plate 36, connected with the frame of the reflector 31. When the electromagnets 35 are deënergized, the armature-plate 36 will be released, and the spring 33 will restore the reflector 31 to its right-angular position shown. The circuit-wires leading to the electromagnets 35 are not illustrated, since they involve ordinary practice; but it may be said that they will extend downwardly through the space intermediate the inner and outer tubes 25 26 of the instrument.

At the lower end of the box 28 will be provided suitable electric lamps 37, the circuit-wires for which will also extend downwardly through the space between the outer and inner tubes 25 26, and which lamps are provided for the purpose of illuminating the region about the lower end of the instrument.

The instrument 14 will be mounted centrally within the exterior inclosing tube 11 and will preferably be provided with centering-flanges 38, secured to the outer tube 25 and at their outer edges extending nearly to the inner walls of the tube 11, as shown in Fig. 3, and upon the exterior of the box 28 will preferably be provided the series of spiral blades 39, adapted at their outer edges to substantially engage the inner walls of the tube 11, these blades 39 serving to center said box 28 within the tube 11 and also during the vertical movements of the instrument within said tube to scrape and remove any sediment or foreign matter from the walls of said tube. The box 28 is preferably formed in two parts, the upper part carrying the blades 39 and the lower part 40 supporting the reflector, electromagnets, lamps, and vertically-projected lens 29. The eyepiece or auxiliary telescope 27 at the upper end of the instrument is of commercial construction. The instrument 14 will project upwardly above the upper end of the inclosing tube 11, and suitable means must be provided for raising and lowering and supporting said instrument, and in the present instance I provide a windlass 41 and cable 42 for effecting the raising and lowering of the instrument 14, and upon the outer tube 25 of said instrument I provide a stop-band 43, which when the instrument is in its lower position will rest upon the upper end of the inclosing tube 11, as shown by full lines in Fig. 1, the lower end of the instrument at that time projecting below the bottom of the vessel, which will be the position of the instrument during its employment in taking observations either directly downwardly or horizontally.

When the instrument 14 is not in use, it will be held within the tube 11, the lower end of the instrument being above the seat for the valve 16 and said valve being in its closed position, and when it is desired to use the instrument the attendant will open the valve 16 and lower the instrument through the tube 11 until the lower end of said instrument has about reached the position indicated in Fig. 1, and thereupon observations may be made either directly downwardly by means of the lens 29 or horizontally through the medium of the lens 30 and reflector 31. After the observations have been made through the instrument the latter may be withdrawn upwardly into the tube 11 and the valve 16 again closed.

Since I deem it better that the lower end of the instrument shall not be exposed below the keel 25, I provide a duplicate tube 11 and instrument 14 at each side of the vertical line of said keel, as indicated in Fig. 1, so that observations in a vertical direction may be taken at each side of the keel and also in opposite horizontal directions, the objective lens 30 for the right-hand instrument, looking at Fig. 1, being projected toward the right and the like lens for the left-hand instrument being projected toward the left.

There are times in the use of the instrument when it will not be necessary to light the lamps 37; but at other times it will be necessary to illuminate the region about the lower end of the instrument. It may also be found necessary, especially on war vessels, to at times conceal the illumination created by the lamps 37 as much as possible, and at such times the instrument may be lowered to but not through the hole 12 in the bottom of the vessel. When the instrument is drawn upwardly above the seat for the valve 16 and said valve is closed, it is obvious that the illumination from the lamps 37 will not be reflected through the water.

The upper end of the instrument 14 may be disposed either over a special platform or floor 22 or said instrument may be extended upwardly to the bridge 41, as denoted by dotted lines in Fig. 1.

In my aforesaid pending application I illustrate and describe a submarine instrument comprising the outer and inner tubes 25 26 and having at its upper end the telescope 27 and at its lower end the box carrying vertically and horizontally projected collecting-lenses and electric lamps and containing the movable reflector 31, and hence these features are not separately claimed herein, the present invention having to do with the combination of the instrument with the outer tube 11 and coacting parts and the adaptation of said instrument for said tube.

In Figs. 7 and 8 the electrical connections for the electromagnets 35 and lamps 37 are shown. The circuit-wires for the electromagnets 35 and lamps 37 will extend downwardly through the space between the outer and inner tubes 25 26, and I designate the said wires for the magnets 35 by the reference-letters $a$ $a$ and the said wires for the lamps as $b$ $b$. One of the wires $a$ is wrapped upon one of the magnets 35, and then passes to and is wrapped upon the other magnet 35, and then passes upwardly between the tubes 25 26 as the other wire $a$. One of the wires $b$ passes downwardly between the tubes 25 26 and to one of the lamps 37, and thence to the other lamps 37, and thence returns up through the space between the tubes 25 26 as the other wire $b$. There is no novelty in the electrical connections for the magnets 35 and lamps 37.

What I claim as my invention, and desire to secure by Letters Patent, is—

1. A vessel having a tube extending down through it in line with a hole in the bottom of the vessel, and a submarine telescope mounted in said tube and having at its lower end a lens, with means for supporting and raising and lowering the instrument within said tube; substantially as set forth.

2. A vessel having a tube extending down through it in line with a hole in the bottom of the vessel, and a submarine telescope mounted in said tube and having at its lower end a lens and means for illuminating the region about said lens, with means for supporting and raising and lowering the instrument within said tube; substantially as set forth.

3. A vessel having a tube extending down through it in line with a hole in the bottom of the vessel, a gate for opening and closing the lower end of said tube, and a submarine telescope mounted in said tube and having at its lower end a lens, with means for supporting and raising and lowering the instrument within said tube; substantially as set forth.

4. A vessel having a tube extending down through it in line with a hole in the bottom of the vessel, a gate for opening and closing the lower end of said tube, and a submarine telescope mounted in said tube and having at its lower end a lens and means for illuminating the region about said lens, with means for supporting and raising and lowering the instrument within said tube; substantially as set forth.

5. A vessel having a tube extending down through it in line with a hole in the bottom of the vessel, a gate for opening and closing the lower end of said tube, and a submarine telescope mounted in said tube and having at its lower end a lens, with means for supporting and raising and lowering the instrument within said tube, and means extending downwardly from about the upper end of the instrument for operating said gate; substantially as set forth.

6. A vessel having a tube extending down through it in line with a hole in the bottom of the vessel, and a submarine telescope mounted in said tube and having at its lower end a box carrying downwardly and horizontally projected lenses and a movable reflector for coöperation with said horizontally-projected lens, with means for raising and lowering and supporting the instrument within said tube; substantially as set forth.

7. A vessel having a tube extending down through it in line with a hole in the bottom of the vessel, and a submarine telescope movable vertically in said tube and having at its lower end a lens and a series of scraper-blades to engage the inner walls of said tube; substantially as set forth.

8. A vessel having a tube extending down through it in line with a hole in the bottom of the vessel and provided with a gate to open or close the lower end of said tube, and a submarine telescope mounted to be moved vertically within said tube and having means for centering it within the same, said instrument having a lens at its lower end; substantially as set forth.

9. A vessel having vertical tubes at opposite sides of its keel in line with openings in the bottom of the vessel and extending upwardly within the vessel above the waterline, said tubes having gates for opening or closing their lower ends, and submarine telescopes mounted to be moved vertically within said tubes and having lenses at their lower ends; substantially as set forth.

10. A vessel having vertical tubes at opposite sides of its keel in line with openings in the bottom of the vessel and extending upwardly within the vessel above the waterline, said tubes having gates for opening or closing their lower ends, and submarine telescopes mounted to be moved vertically within said tubes and having lenses and means for illumination at their lower ends; substantially as set forth.

Signed at New York city, in the county of New York and State of New York, this 28th day of November, A. D. 1904.

EDWARD A. TRAPP.

Witnesses:
CHAS. C. GILL,
ARTHUR MARION.